June 21, 1960
R. D. COWHERD
2,941,546
PLUG-IN VALVE
Filed Oct. 7, 1958
2 Sheets-Sheet 1
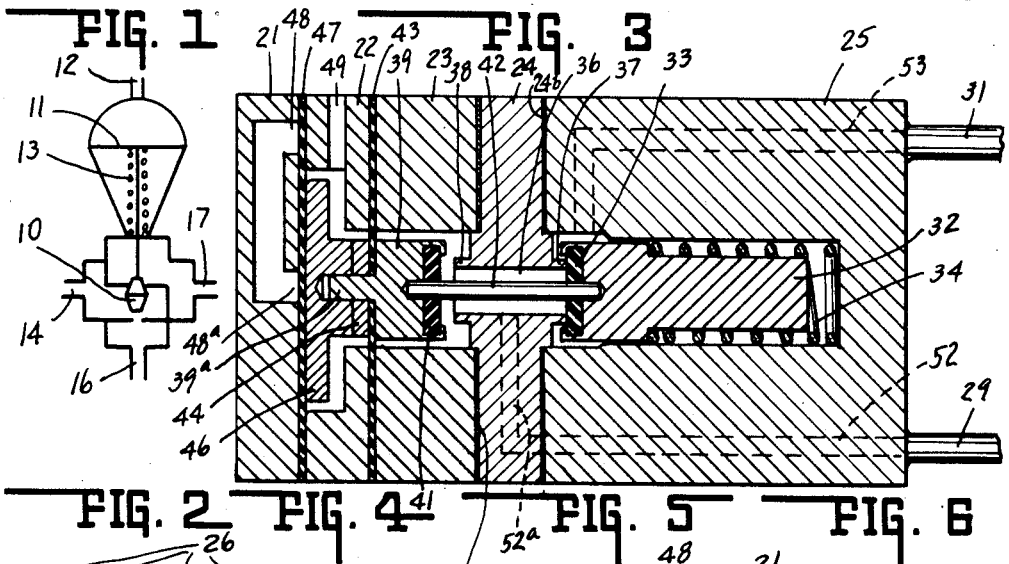
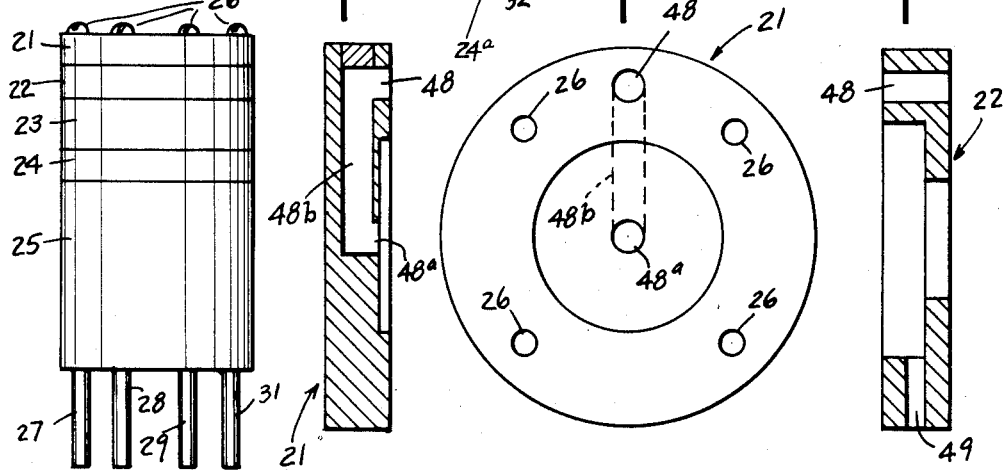
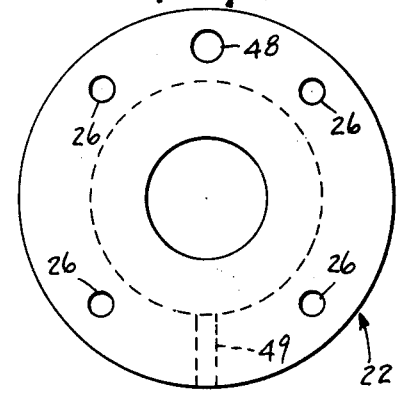
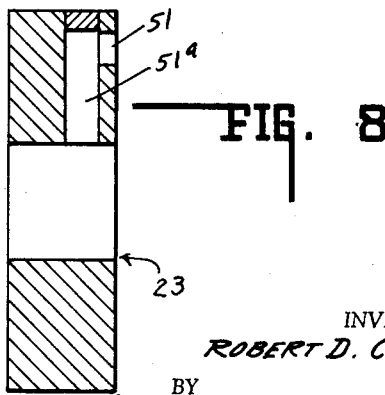
INVENTOR.
ROBERT D. COWHERD.
BY
Lockwood, Galt, Woodard & Smith
ATTORNEYS.

June 21, 1960  R. D. COWHERD  2,941,546
PLUG-IN VALVE
Filed Oct. 7, 1958  2 Sheets-Sheet 2
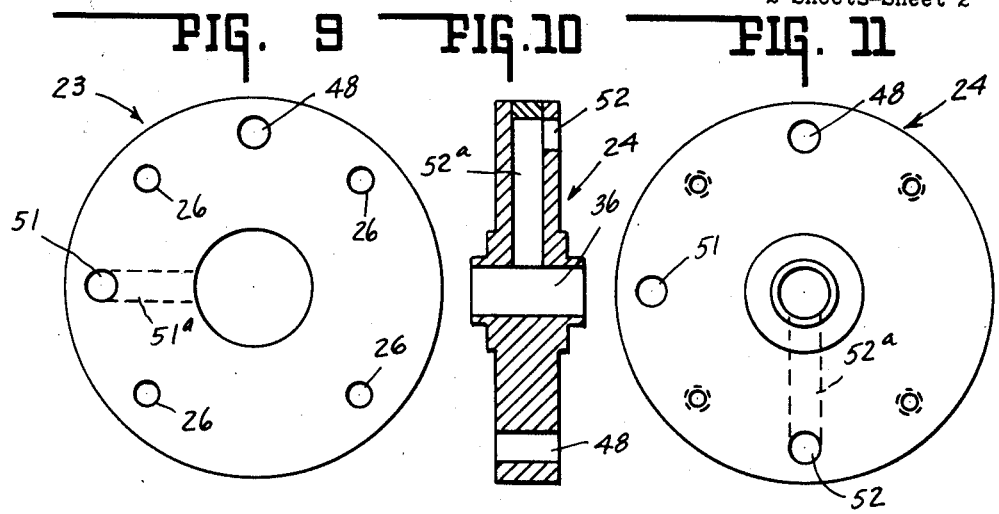
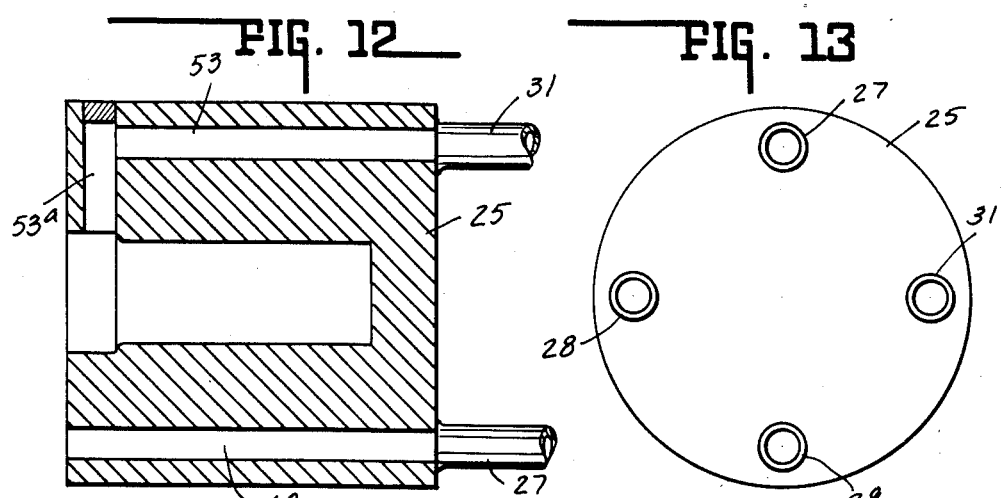
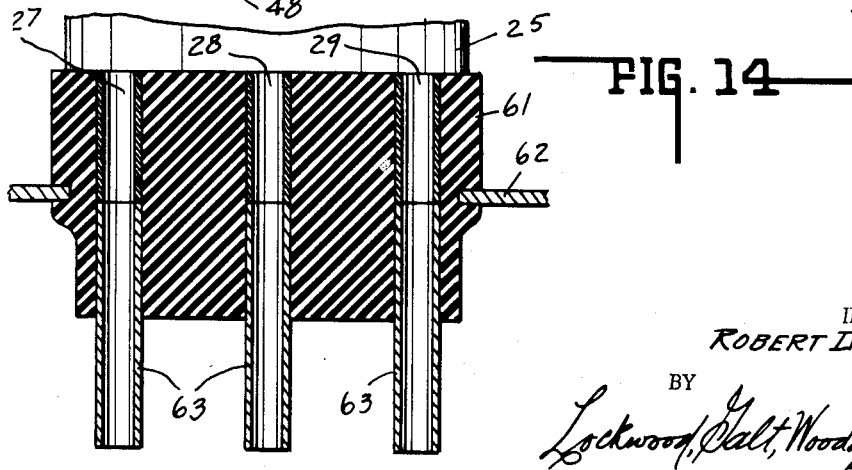
INVENTOR.
ROBERT D. COWHERD.
BY
Lockwood, Galt, Woodard & Smith
ATTORNEYS.

United States Patent Office 2,941,546
Patented June 21, 1960

2,941,546

PLUG-IN VALVE

Robert D. Cowherd, R.R. 2, Box 403–A1,
West Terre Haute, Ind.

Filed Oct. 7, 1958, Ser. No. 765,854

6 Claims. (Cl. 137—620)

This invention relates generally to pilot valves of the type utilized in fabricating pneumatic control circuits, and in particular to a valve of this type adapted for convenient installation in or removal from pneumatic control circuits.

In my copending application Serial No. 699,238, filed November 27, 1957, now Patent No. 2,904,073, and titled "Instantaneously Acting Pneumatic Timer," there is disclosed a pneumatic control system utilizing a conventional type of pressure-responsive pilot valve. The pilot valves used in the system of the aforementioned patent and in other types of pneumatic systems, although designed to operate at relatively low control pressures of the order of twenty pounds per square inch, are customarily provided with threaded couplings to their various ports and thus require considerable time and trouble to remove or replace. Further, conventional pilot valves of this type are rather bulky and irregular in configuration so that they cannot be conveniently grouped in a minimum of space on a control panel or the like.

It is an object of the present invention to provide a pilot valve adapted to be connected into a pneumatic control system by a "plug-in" operation.

A further object of the present invention is to provide a pressure responsive pilot valve having portions adapted to be removably accommodated in a suitably formed, panel mounted socket with its various ports and chambers being thereby connected into a pneumatic system or circuit.

A further object of the present invention is to provide a plug-in type pilot valve which has a relatively small, cylindrical outer configuration thereby being adapted for grouping in a minimum space upon a control panel or the like.

A further object of the present invention is to provide a plug-in type pilot valve formed by a series of superimposed parts providing a simplified construction lending itself to convenient assembly and disassembly.

These and other objects will become apparent as the description proceeds with reference to the accompanying drawings in which:

Fig. 1 is a diagrammatic view of a conventional pilot valve.

Fig. 2 is a side view of a pilot valve embodying the present invention.

Fig. 3 is a side sectional view of the valve shown in Fig. 2.

Fig. 4 is a side sectional view of a component of the valve shown in Fig. 3.

Fig. 5 is a right hand end view of the component shown in Fig. 4.

Fig. 6 is a side sectional view of a further component of the valve shown in Fig. 3.

Fig. 7 is a right hand end view of the component shown in Fig. 6.

Fig. 8 is a sectional view of a further component of the valve shown in Fig. 3.

Fig. 9 is a right hand end view of the component shown in Fig. 8.

Fig. 10 is a side sectional view of a further component of the valve shown in Fig. 3.

Fig. 11 is a right hand end view of the component shown in Fig. 10.

Fig. 12 is a side sectional view of a further component of the valve shown in Fig. 3.

Fig. 13 is a right hand end view of the component shown in Fig. 12.

Fig. 14 is a fragmentary view illustrating the mode of mounting the valve shown in Fig. 3.

Referring initially to Fig. 1, there is shown a pneumatic pilot valve of conventional design and of the type utilized in such pneumatic control systems as that disclosed and claimed in my aforementioned co-pending patent application. This valve includes a body having normally closed and normally open valve seats. A valve member 10 cooperates with the valve seats under the control of a flexible diaphragm 11. Control pressure may be introduced into the space above the diaphragm through the control port 12, movement of the diaphragm under control pressure being resisted by a compression spring 13. The valve body is provided with a common port 14, a normally open port 16, and a normally closed port 17. By applying control pressure to the space above the diaphragm 11 the valve member 10 may be moved to reverse its position relative to the valve seats, thereby interrupting communication between the ports 14 and 16 and establishing communication between the ports 14 and 17.

The valve embodying the present invention is constructed to function the same as the valve shown schematically in Fig. 1. Referring to Figs. 1 and 2, the valve embodying the present invention is composed of the generally cylindrical housing formed by superimposed generally disc-shaped members 21, 22, 23, 24 and 25, held in assembled relation by means of through bolts or screws 26. The junctures between member 24 and members 23 and 25 are sealed by gaskets 24a and 24b, respectively. Extending from the end of component 25 are four rigid tubes 27, 28, 29 and 31. The tubes are each connected to passages formed within the valve body as will subsequently be described.

The superimposed disc-shaped components are suitably apertured to provide a central cavity which is concentric with the axis of the housing. The portion of the cavity extending into the member 25 houses an element 32 which, at its inner end, carries a valve facing 33 which may be formed of a somewhat resilient, chemical resistant material of any suitable type. The outer end of the element 32 is somewhat reduced in diameter to provide a shoulder for seating a compression spring 34 which bottoms at the end of the cavity.

The component 24 has a central passage 36, and at each end of the passage the component 24 is formed to provide a normally closed valve seat 37 and a normally open valve seat 38. The valve assembly, of which the element 39, which, adjacent the valve seat 38 carries valve facing 41 which may be identical to the valve facing 33. The elements 39 and 32 are interconnected by means of a pin 42 which extends centrally through the passage 36 and freely into opposed apertures in the elements 32 and 39. A sealing diaphragm 43 is interposed between the components 22 and 23 and by means of ring 44 seals the normally closed and normally open valve portion of the cavity from the remaining portion thereof.

The central aperture in the component 22 is enlarged to accommodate an element 46. The element 46 is centrally apertured to freely accommodate the reduced end 39a of the element 39.

Extending across one end of the central cavity in the housing is a flexible diaphragm 47, the inner face of which is in contact with element 46. The element 21 overlies the diaphragm 47, and, as may best be seen in Figs. 3 and 5, is provided with a central aperture 48a and a communicating, radial aperture 48b which connects with a passage 48 extending parallel to the axis of the valve housing. As will be evident from Figs. 5–13 the remaining components of the valve are drilled so that the passage 48 extends therethrough and communicates with the tube 27, the tube 27 and the passage 48 thus providing a control port for the valve which is the counterpart of the control port 12 of the conventional valve shown in Fig. 1.

The portion of the cavity formed within the component 22 is vented to atmosphere by means of the passage 49 extending radially through the element 22. As will be evident from Figs. 8 and 9, the component 23 is provided with a radially extending passage 51a which communicates with a passage 51 extending parallel to the axis of the housing. As may be seen in Fig. 11, the component 24 is drilled to permit the passage 51 to communicate with the tube 28 through a drilled aperture in member 25 not visible in the drawings but which is concentric with the tube 28 as viewed in Fig. 13. The tube 28 and the passage 51 thus provide a normally open port for the valve which is the counterpart of the port 16 of the valve of Fig. 1 and which communicates with the space adjacent the valve seat 38.

As may best be seen in Figs. 10 and 11, a radial passage 52a communicates with the passage 36 in the component 24 and further communicates with the passage 52 extending parallel to the axis of the valve. Although not visible in either Fig. 3 or Fig. 12 the component 25 is suitably drilled to extend the passage 52 therethrough permitting it to communicate with the tube 29. The tube 29 and passage 52 provide a common port for the valve which is the counterpart of the port 14 of the valve shown in Fig. 1, this port communicating with the passage 36 between the valve seats.

As may be seen in Figs. 3 and 12 the component 25 is provided with a radial extending passage 53a which communicates with a passage 53 extending parallel to the axis of the housing and communicating with the tube 31. The tube 31 and the passage 53 provide a normally closed port for the valve which is the counterpart of the port 17 of the valve of Fig. 1 and which communicates with the space adjacent the valve seat 37.

In operation, with control pressure cut off from the tube 27 and hence from the passage 48, the spring 34 will hold the valve element 32 against the normally closed seat 37. It can be demonstrated that the pressure in the space adjacent the normally open valve seat, acting on unequal areas, also tends to bias valve element 39 away from normally open valve seat 38. Communication will thus be established between the tube 29 and the tube 28 by means of the passage 52, 52a, 36, 51a and 51. Communication is thus provided between the common and the normally open ports of the valve. With the introduction of control pressure through the tube 27 into the passage 48, the diaphragm 47 will be deflected rightwardly, as viewed in Fig. 3, to close the valve element 39 against the normally open valve seat 38 and to disengage the valve element 32 from the normally closed valve seat 37. This movement of the valve assembly breaks off communication between the tubes 28 and 29 and establishes communication between the tubes 29 and 31, thereby providing communication between the normally closed and common ports of the valve. It can be demonstrated that the pressure in the passage 36, acting on unequal areas, tends to retain the valve element 32 away from the normally closed seat 37 against the force exerted by spring 34. Subsequent removal of control pressure from the passage 48 permits the valve to return to its position of Fig. 3. It should be noted that the venting to atmosphere of the space adjacent the inner face of diaphragm 47 permits the diaphragm to respond to pressure in passage 48 without being affected by any variation in pressure in the space adjacent the normally open or normally closed valve seats.

Referring to Fig. 14, the valve body may be mounted by inserting its extending tubes into an appropriately apertured socket 61 formed of rubber or similar elastic material and having a circumferential groove permitting the socket to be mounted on a control panel 62. The socket member 61 supports tubes 63 which, when the valve is in place on the socket, communicate with the aligned tubes extending from the valve body, these tubes being connected by tubing (not shown) integrating the valve into a pneumatic control system. It will be noted that the plug-in function of the valve tubes permits the valve to be conveniently removed and replaced in its accommodating socket.

The valve of the present invention is provided with a generally cylindrical outer configuration thereby permitting a maximum number of these pilot valves to be mounted in a minimum of control panel area. The arrangement whereby the valve body is disposed above the control panel with its connecting tubing below the panel permits visual simplification of the control panel when viewed from its front face, the maze of interconnecting tubing being disposed beneath the panel.

The valve of the present invention may be conveniently disassembled merely by removal of its through bolts or screws permitting the stacked components to be separated from each other.

While the invention has been disclosed and described in some detail in the drawings and the foregoing description, they are to be considered as illustrative and not restrictive in character, as other modifications may readily suggest themselves to persons skilled in this art and within the broad scope of the invention, reference being had to the appended claims.

The invention claimed is:

1. A plug-in type pilot valve comprising a cylindrical housing having spaced, rigid tubes extending from one endwall, said tubes being adapted to be received within an accommodating socket and providing a normally open port, a normally closed port, a common port and a control port for said valve, said housing being formed by superimposed members apertured to provide a central axial cavity within said housing, an intermediate one of said members being formed to provide dual spaced valve seats joined by a passage therebetween, said valve seats and said passage being concentric with said cavity, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across one end of said cavity, said valve assembly having a portion engaged by the inner face of said diaphragm for movement thereby, means sealing the portion of said cavity adjacent the inner face of said diaphragm from the remaining portion of said cavity, and apertures in said housing providing communication between the face of said diaphragm remote from said valve assembly and said control port, venting to atmosphere the opposite face of said diaphragm, providing communication between the portions of said cavity adjacent said normally open and normally closed valves and said normally open and normally closed ports respectively, and providing communication between said passage between said valve seats with said common port.

2. A plug-in type pilot valve comprising a cylindrical housing having spaced, rigid tubes extending from one endwall, said tubes being adapted to be received within an accommodating socket and providing a normally open port, a normally closed port, a common port and a control port for said valve, said housing being formed by superimposed members apertured to provide a central axial cavity within said housing, an intermediate one of said members being formed to provide dual spaced valve seats joined by a passage therebetween, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across said cavity, said valve assembly having a portion engaged by said diaphragm for movement thereby, means sealing the portion of said cavity adjacent the juncture of said diaphragm and said valve assembly, and apertures in said housing providing communication between the face of said diaphragm remote from said valve assembly and said control port, venting to atmosphere the opposite face of said diaphragm, providing communication between the portions of said cavity adjacent said normally open and normally closed valves and said normally open and normally closed ports respectively, and providing communication between said passage between said valve seats with said common port.

3. A plug-in type pilot valve comprising a cylindrical housing having spaced, rigid tubes extending from one endwall, said tubes being adapted to be received within an accommodating socket and providing a normally open port, a normally closed port, a common port and a control port for said valve, said housing having a central axial cavity, means providing dual spaced valve seats within said cavity joined by a passage therebetween, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across said cavity, said valve assembly having a portion engaged by said diaphragm for movement thereby, means sealing the portion of said cavity adjacent the juncture of said diaphragm and said valve assembly, and apertures in said housing providing communication between the face of said diaphragm remote from said valve assembly and said control port, venting to atmosphere the opposite face of said diaphragm, providing communication between the portions of said cavity adjacent said normally open and normally closed valves and said normally open and normally closed ports respectively, and providing communication between said passage between said valve seats with said common port.

4. A plug-in type pilot valve comprising a cylindrical housing having spaced, rigid tubes extending from one endwall, said tubes being adapted to be received within an accommodating socket and providing a normally open port, a normally closed port, a common port and a control port for said valve, said housing having a central cavity therein, means providing dual spaced valve seats within said cavity joined by a passage therebetween, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across said cavity, said valve assembly having a portion engaged by said diaphragm for movement thereby, and apertures in said housing providing communication between the face of said diaphragm remote from said valve assembly and said control port, providing communication between the portions of said cavity adjacent said normally open and normally closed valves and said normally open and normally closed ports respectively, and providing communication between said passage between said valve seats with said common port.

5. A plug-in type pilot valve comprising a housing having spaced, rigid tubes extending from one end thereof, said tubes being adapted to be received within an accommodating socket and providing a normally open port, a normally closed port, a common port and a control port for said valve, said housing having a cavity therein, means providing dual spaced valve seats within said cavity joined by a passage therebetween, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across said cavity, said valve assembly having a portion engaged by said diaphragm for movement thereby, and apertures in said housing providing communication between the face of said diaphragm remote from said valve assembly and said control port, providing communication between the portions of said cavity adjacent said normally open and normally closed valves and said normally open and normally closed ports respectively, and providing communication between said passage between said valve seats with said common port.

6. In combination, a plug-in type pilot valve comprising a housing having spaced, rigid tubes extending from one end thereof, a socket member adapted to be mounted on a control panel or the like and apertured to receive said tubes, said tubes providing a normally open port, a normally closed port, a common port and a control port for said valve, said housing having a central axial cavity therein, means providing dual spaced valve seats within said cavity joined by a passage therebetween, a valve assembly including spaced valve members cooperating respectively with said valve seats, said valve members having faces arranged to engage said valve seats for the closing thereof, said faces having a greater area than the openings of said valve seats, means biasing one of said valve members into engagement with its seat to provide a normally closed valve and the other valve member out of engagement with its seat to provide a normally open valve, a flexible diaphragm extending across said cavity, said valve assembly having a portion engaged by said diaphragm for movement thereby, and apertures in said housing providing communication between the face of said diaphragm remote from said valve assembly and said control port, providing communication between the portions of said cavity adjacent said normally open and normally closed valves and said normally open and normally closed ports respectively, and providing communication between said passage between said valve seats with said common port.

References Cited in the file of this patent

UNITED STATES PATENTS

| | | |
|---|---|---|
| 2,711,754 | McKinney | June 28, 1955 |
| 2,730,379 | Gorrie | Jan. 10, 1956 |
| 2,763,280 | Snyder | Sept. 18, 1956 |